US009317746B2

(12) United States Patent
Shoemaker

(10) Patent No.: US 9,317,746 B2
(45) Date of Patent: Apr. 19, 2016

(54) TECHNIQUES FOR OCCLUSION ACCOMODATION

(71) Applicant: Intel Corporation, Santa Clara, CA (US)

(72) Inventor: Garth Shoemaker, Sunnyvale, CA (US)

(73) Assignee: INTEL CORPORATION, Santa Clara, CA (US)

( * ) Notice: Subject to any disclaimer, the term of this patent is extended or adjusted under 35 U.S.C. 154(b) by 508 days.

(21) Appl. No.: 13/626,725

(22) Filed: Sep. 25, 2012

(65) Prior Publication Data

US 2014/0085342 A1 Mar. 27, 2014

(51) Int. Cl.
*G06F 3/01* (2006.01)
*G06K 9/00* (2006.01)
*G06F 3/03* (2006.01)
*G09G 5/14* (2006.01)

(52) U.S. Cl.
CPC ............ *G06K 9/00597* (2013.01); *G06F 3/017* (2013.01); *G06F 3/0304* (2013.01); *G06K 9/00355* (2013.01); *G09G 5/14* (2013.01); *G09G 2340/0464* (2013.01); *G09G 2340/14* (2013.01); *G09G 2354/00* (2013.01)

(58) Field of Classification Search
None
See application file for complete search history.

(56) References Cited

U.S. PATENT DOCUMENTS

| 7,199,767 | B2* | 4/2007 | Spero | 345/7 |
| 2006/0050091 | A1* | 3/2006 | Shoemaker et al. | 345/661 |
| 2006/0244735 | A1* | 11/2006 | Wilson | 345/173 |
| 2011/0018903 | A1* | 1/2011 | Lapstun et al. | 345/633 |
| 2015/0035746 | A1* | 2/2015 | Cockburn et al. | 345/156 |

OTHER PUBLICATIONS

Vogel D. and Casiez G., "Hand occlusion on a multi-touch tabletop". In Proceedings of ACM CHI 2012. pp. 2307-2316 (2012).
Vogel D. and Balakrishnan, R., "Occlsusion-aware interfaces". In Proceedings of ACM CHI 2010. pp. 263-272 (2010).

* cited by examiner

*Primary Examiner* — Xiao Wu
*Assistant Examiner* — Steven Elbinger
(74) *Attorney, Agent, or Firm* — Kacvinsky Daisak Bluni PLLC

(57) ABSTRACT

Techniques may be used to accommodate occlusion. An occlusion accommodation application may determine a display position of a display of a computing device, an eye position of an eye of a user and an object position of an object. The object may be positioned between the display and the eye of the user. The occlusion accommodation application may identify, in real-time, an occluded area based on the display position, object position and the eye position.

27 Claims, 9 Drawing Sheets

Occlusion Accommodation Application 120

- Viewing Perspective Component 222
- Occluded Area Determination Component 224
- Content Adjustment Component 226
- Occlusion Warning Component 228

DETERMINE, RELATIVE TO A DISPLAY POSITION OF A DISPLAY, AN EYE POSITION OF A USER, A DISPLAY POSITION OF A DISPLAY AND AN OBJECT POSITION OF AN OBJECT
705

IDENTIFY AN OCCLUDED AREA ON THE DISPLAY BASED ON THE OBJECT POSITION, THE DISPLAY POSITION AND THE EYE POSITION.
710

PRESENTING CONTENT FROM THE OCCLUDED AREA ON THE DISPLAY IN A DIFFERENT AREA ON THE DISPLAY.
715

FIG. 7

TECHNIQUES FOR OCCLUSION ACCOMODATION

BACKGROUND

When a user interacts with a computing device via a gesture recognition system, the user's fingers often cover an area of the display when gesturing. For example, a user may gesture to turn a page in a book presented on the display of the computing device. Alternatively, the user may be gesturing with an item in his/her fingers while playing a three dimensional augmented reality video game. While the user is gesturing, the user's fingers and/or the item in the user's fingers may occlude the user from viewing an area of the display. As a result, it is difficult for the user to view the occluded content on the display.

Current solutions to this occlusion problem estimate the location of a user's fingers to determine an occluded area on the display based on a user's fingers touching the display. The content from the occluded area on the display is moved based on the estimated placement of the user's fingers. However, if the user's fingers are positioned differently than the computing device estimates, the moved content may still be occluded from the user's view. Additionally, because current solutions only estimate the position of a user's fingers, the computing system does not account for any item that the user is holding which also may occlude the user's view of an area on the display. Another shortcoming of current solutions is that they require the user's hand to be in contact with a touch-sensitive screen in order to function. Those approaches will not work if the user's hand is in mid-air or if the screen is not touch sensitive. Accordingly, a need exists for improved techniques to solve these and other problems.

BRIEF DESCRIPTION OF THE DRAWINGS

FIG. 2 illustrates a block diagram of a second system.
FIG. 7 illustrates one embodiment of a logic flow.

DETAILED DESCRIPTION

Figure 1:
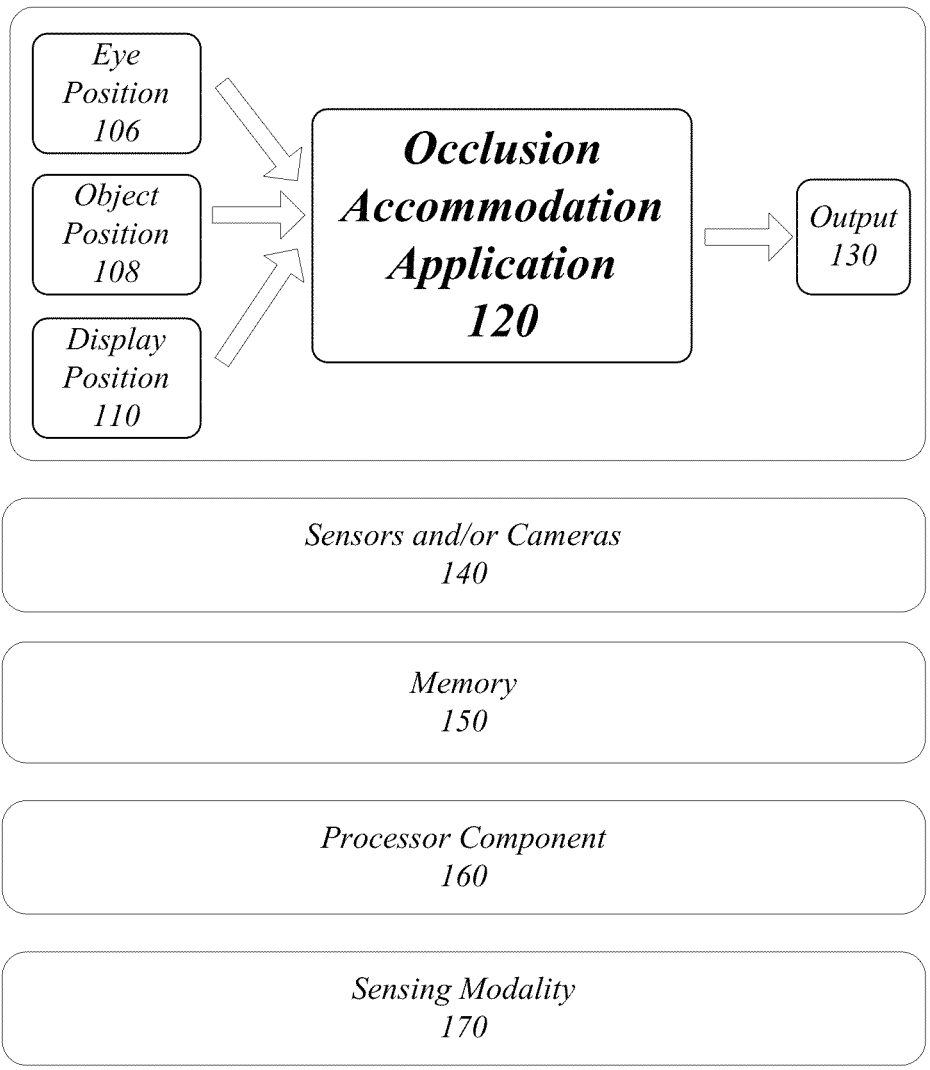
FIG. 1 illustrates a block diagram of a first system.

Embodiments are generally directed to occlusion detection and accommodation techniques. Some embodiments are particularly directed to determining and accommodating occlusion for a two-dimensional (2D) or three-dimensional (3D) gesture interface. Occlusion is the blocking or obstructing of someone's line of sight. In one embodiment, for example, an occlusion accommodation application in a computing device may, in real-time, determine position information about an object in a 3D space, such as a spatial area between a user and a display of the computing device. The object may include one or more of a user's anatomy (e.g., hands, fingers, digits, arms, shoulders, etc.) and/or an item held by a user (e.g., a control device) while the user is interacting with the computing device and viewing a display of the computing device.

The occlusion accommodation application may include an occluded area determination component which determines an occluded area based on an object position of the object, a display position of the display and an eye position of the user's eye. The occluded area determination component may determine in real-time that the object occludes an area of the display based on the viewing perspective of the user. By way of contrast, conventional occlusion systems do not accurately determine a position of an object obstructing a user's view. Instead, the current systems assume that the object causing the occlusion is a hand and merely approximate a position of the object based on the point or points at which the object touches the display. Therefore, unlike the embodiments described herein, the current systems are limited to determining occlusion based on an estimated location of a hand touching a display. However, the embodiments described herein can determine in real-time an actual occluded area based on the user's viewing perspective and a position of an object between the display and the user's eye that is causing an occlusion.

Occlusion may occur for any number of reasons. In an embodiment, for example, an object may occlude the user's view as a result of a user gesturing. A computing device with a gesture interface system may receive gestures from a user, and interpret the gestures as control directives to control operations for the computing device. The gestures may include a user touching the screen and/or a user motioning in midair. While performing gestures, an object may occlude an area of a display of the computing device from the user's viewing perspective. For example, a user may perform a gesture which causes the user's hand to pass between her eyes and the display device, thereby temporarily blocking her vision of a certain portion of the content presented on the display device for a certain period of time.

An object may occlude a user's view for reasons other than gesturing. For example, a user may scratch his forehead causing an area of the display to be occluded by his forearm. In an alternative example, an item, such as a remote, may occlude a user's view of the display as the item is pointed towards the display device. The embodiments are not limited to these examples. Regardless of the reason for the occlusion, the occlusion accommodation application may determine, in real-time, whether an object occludes an area of a display from the perspective of the user.

Conventional systems do not account for the user's viewing perspective. Instead of determining the eye position and the display position, current systems assume that the user is looking straight at the display at a 90 degree angle. However, this assumption often causes the occluded area estimation to be significantly inaccurate. For example, a user waving his or her hand may occlude the user's view of one area of the display when the user's head and eye are in one position, but may occlude a different area of the display when the user's head and eye are in a different position. For example, the user's head may be turned to the left or the right, or leaning the user's body left or right, thus changing the user's viewing perspective of the display.

To solve these and other problems, an occlusion accommodation application may determine real-time position information for multiple objects to more precisely determine an occlusion. In one embodiment, for example, real-time position information may include position information about a position of a display for a computing device, a position of one or more of the user's eyes, and a position of an object between the display and the user's eye that is potentially causing an occlusion. As a result of this information, an occlusion accommodation application may determine an area on the display that is occluded from the user's view based on the user's viewing perspective.

In one embodiment, for example, an apparatus may include a processor circuit and an occlusion accommodation application operative on the processor circuit to determine an occluded area on a display. The occlusion accommodation application may include a viewing perspective component arranged to determine an eye position of at least one eye of a user and a display position of the display. By knowing the position of a user's eye, the viewing perspective component may calculate a three dimensional viewing area between the user's eye and the display.

The viewing perspective component of the occlusion accommodation application may determine the real-time position of one or both of the user's eyes. One or more sensors and/or cameras may determine the position of the user's eye. In an embodiment, a number of different algorithms may be involved in determining the user's eye position. For example, a sensor may capture data (e.g., an image) and pass the captured data to an algorithm. The algorithm may process the captured data and determine the eye position. In an embodiment, the algorithms may be part of the occlusion accommodation application. Alternatively, the algorithms may process the captured data prior to the eye position being received by the occlusion accommodation application. A camera may include, but is not limited to, a depth camera, a stereo camera, a Red-Green-Blue (RGB) camera, or an infrared camera. A sensor may include, but is not limited to, a gyroscope, a proximity sensor, an image sensor or a laser emitter. Using the position of the user's eye determined by the one or more sensors and/or cameras and/or one or more algorithms, the viewing perspective component may accurately determine the viewing perspective of the user.

In addition to the viewing perspective component, the occlusion accommodation application may include an occluded area determination component. The occluded area determination component may determine an occluded area based on an object position of an object, the display position and the eye position. The occluded area determination component may receive a position of an object in real-time from the one or more sensors and/or cameras. For example, the occluded area determination component may receive the position of the user's hand during a gesture in midair as the object position. Alternatively, the occluded area determination component may receive the position of the user's fingers pointing to content on the display as the object position. The embodiments are not limited to these examples. The occlusion accommodation application may identify an occluded area on the display based on the object position, the eye position and the display position.

The embodiments described herein are unlike current systems which do not accurately determine a position of an object obstructing a user's view. As current systems do not use one or more sensors and/or cameras to determine a position of the object, the current systems assume that the object causing the occlusion is a hand. Current systems cannot account for other items which occlude the user's view of the display.

Furthermore, the current systems cannot determine the actual position of the object. Current systems can only approximate a position of the object based on the point or points touching the display. The current systems assume that these points touching the display are fingers from the user's hand and approximate the object position using simple geometries and assumptions of where a hand might be positioned. Therefore, unlike the embodiments described herein, the current systems cannot account for minor changes in a position of the object. For example, the current systems cannot account for a small movement of the thumb. As a result, the occluded area is not adjusted when minor changes in a positioning of the object occur and the current systems' approximated hand often results in an inaccurate determination of the occluded area.

Additionally, current systems cannot determine the position of an object in midair. Instead, a user must touch the display in order for the computing system to approximate the position of the object and determine an occluded area. Accordingly, in current systems a user cannot view the content in an area of the display which is occluded by an object in midair.

The embodiments described herein determine, relative to a display position of a display, an eye position of a user and an object position of an object. The occlusion accommodation application may identify an occluded area based on the object position, the display position and the eye position. Content from the occluded area on the display may be presented in a different area on the display. Content may include but is not limited to, dialog boxes, toolbars, images, pictures, words, letters, numbers, symbols, videos, animations, media information, digital information.

The embodiments provide several advantages over conventional techniques used to determine occlusion. For instance, by determining the actual location of the user's eyes and the display position, the occlusion accommodation application can accurately determine the user's viewing perspective. Furthermore, by determining the actual location of the object, the occlusion accommodation application can accurately determine the occluded area on the display. The occlusion accommodation application can move content from the occluded area to an area that is not occluded based on the user's viewing perspective. This ensures that the user can view, in real-time, the content from the occluded area. The embodiments may improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a system 100. In one embodiment, the system 100 may comprise a computer-implemented system 100 having one or more software applications and/or components. Although the system 100 shown in FIG. 1 has a limited number of elements in a certain topology, it may be appreciated that the system 100 may include more or less elements in alternate topologies as desired for a given implementation.

The system 100 may include, without limitation, a computing device, a mobile device, a personal digital assistant, a mobile computing device, a smart phone, a computer, a personal computer (PC), a desktop computer, a laptop computer, a notebook computer, a netbook computer, an ultrabook computer, a handheld computer, or a tablet computer. The embodiments are not limited in this context.

The system 100 may include a variety of inputs. The inputs may include an eye position 106, an object position 108 and a display position 110. The system 100 may include an occlusion accommodation application 120 which may receive the inputs 106, 108, 110 and calculate an output 130. The system 100 may include one or more sensors and/or cameras 140, a memory 150 and a processing component 160. Optionally, the system 100 may include a sensing modality 170.

The occlusion accommodation application 120 may receive a display position 110. The display may comprise, but is not limited to, a plasma, a liquid crystal display (LCD), a cathode ray tube (CRT), a light emitting diode (LEDs), an organic light emitting diode (OLED) display and/or a red-green-blue (RGB) display, among others.

The display position 110 may include information about the shape of the display. The shape of the display may be the outer boundaries of the display. For example, the display may be a widescreen display such as a 17 inch monitor. In an alternate example, the display may be a smaller display such as a 9 inch display on a laptop. In yet another embodiment, the display may be a 3 inch display on a smart phone. The display position 110 may include at least a display location vector (x, y, z), a direction/normal normalized vector (x, y, z), a up normalized vector (x, y, z), a scalar width (w) and a scalar height (h). If the display is not a rectangular shape or is a non-planar display, the display position 110 may include additional parameters.

The display position 110 may further include information about the orientation of the display. The orientation of the display may be determined by one or more sensors and/or cameras 140. The sensors and/or cameras 140 may include, but are not limited to, a RGB camera, infrared camera and/or sensor, a laser emitter, a depth camera, a gyroscope, a proximity sensor, or a stereo camera. In an embodiment, the orientation of the display may be the position of the display in three dimensional space. In another embodiment, the orientation of the display may be the angle of the display with respect to the user. In yet another embodiment, the orientation for the display may be the angle of the display with respect to the ground. For example, if the display is on a laptop, the display may be viewed by the user at an angle. The orientation of the display may be a position of the display relative to another device. For example, the display position 110 may be determined based on the position of one or more sensors and/or cameras 140 which determine the object position and the eye position. The sensors and/or cameras 140 may be internal or external to the framework of the display. In an embodiment, the position of the sensors and/or cameras 140 may determine the display position. For example, there may be a fixed physical relationship between the one or more sensors and/or cameras 140 mounted in a display bezel and the display itself. When the occlusion accommodation application 120 has information about how the one or more sensors and/or cameras 140 are mounted on the display, then the position of the display may be determined. In an embodiment, the sensors and/or cameras 140 may be placed directly above the display.

The occlusion accommodation application 120 may receive an eye position 106. The eye position 106 may provide a real-time position of one or more of the user's eyes. The position of both eyes of the user may be received as the eye position 106. Alternatively, the eye position 106 may include the position of a single eye. In an embodiment, the occlusion accommodation application 120 may only use one eye for determining occlusion. Alternatively, the occlusion accommodation application 120 may use both eyes for determining occlusion. When the occlusion accommodation application 120 uses the eye position of both eyes to determine the occluded area and the eye position includes a position of only a single eye, the position of the second eye may be determined based on the position of the user's other eye. For example, the occlusion accommodation application 120 may use the average distance between a first eye and a second eye to determine the position of the eyes of the user.

The eye position 106 may provide a real-time position of the user's head. In an alternate embodiment, a circumference of a user's head may be received as the eye position 106. The occlusion accommodation application 120 may determine the actual position of one or more of the user's eyes based on the user's head circumference and/or head shape. For example, the occlusion accommodation application 120 may use the average distance from an ear and an eye to determine the position of one or more eyes of the user.

The eye position 106 may be determined by one or more sensors and/or cameras 140. The sensors and/or cameras 140 may determine the real-time position of one or both of the user's eyes and/or head circumference. The sensors and/or cameras 140 may send the eye position to the occlusion accommodation application 120 via wired or wireless communications. Since the position of the retina in the user's eye is not necessary for determining the viewing perspective, a gaze tracking device is not needed to determine the eye position. However, a gaze tracking device may be used, along with or instead of, one or more sensors and/or cameras 140 to determine the eye position.

When a gaze tracking device is used to determine the eye position, the gaze tracking device may measure eye positions and eye movement. The measuring of eye positions or eye movement is a technique that is sometimes referred to as "eye tracking" or "gaze tracking." Gaze tracking is a technique to measure either a point of a gaze by a user, or a motion of an eye relative to the head. A gaze tracking device may utilize any number of techniques for measuring eye movement. One variant uses video images from which an eye position is extracted. Other variants use search coils or are based on an electrooculogram. In one embodiment, for example, the gaze tracking device may track eye movements of a user utilizing a corneal reflection technique.

A gaze tracking device may monitor and collect eye movement information. The eye movement information may be used to determine the eye position. The eye movement information may include, for example, stationary information, direction information, and distance information, among other types of eye movement information. Stationary information may include a fixed point where eyes are fixated for some defined time interval (e.g., 2 seconds). Direction information may include a direction of eye movement. The direction of eye movement may be expressed from a perspective of a user, such as towards a right side of a user head, towards left side of a user head, towards a top of a user head, towards a bottom of a user head, and any directions in-between these four exemplary directions. Distance information may include a distance of eye movement over a defined time interval. The distance of eye movement may be expressed in terms of an origin point, a termination point, and distance between the origin point and the termination point. The origin point and the termination point may be determined using fixed points indicated by the stationary information. The stationary information, direction information and distance information may be used to define an eye gaze segment. The eye movement information may also include other types of information commonly generated by conventional gaze tracking devices.

The occlusion accommodation application 120 may receive the object position 108. The object position 108 may be received by one or more sensors and/or cameras 140. The sensors and/or cameras 140 may send the object position 108 to the occlusion accommodation application 120 via wired or wireless communications. The object position may include real-time 3D data about the position of an object. The object may include a user's anatomy (e.g., hands, fingers, digits, arms, shoulders, etc.) and/or an item held by a user (e.g., a control device) while the user is interacting with the computing device and viewing a display of the computing device. The object position may include 3D data of the actual location of the object.

Current systems approximate an object position by assuming that the object is a user's hand and estimate the user's hand position using simple geometry from the point at which a user touches a display. By using the one or more points that the object touches the display, the current systems can only estimate or approximate where the object is positioned. Estimating the position of the object does not accurately depict in real-time the actual position of the object. For example, if the object is a hand and the position of a user's hand moves but the point touching the display is the same, the current systems will not account for the different hand position.

Unlike in current systems, the actual data of the three dimensional position of the object may be determined. The object position may be determined by one or more sensors and/or cameras 140. The one or more sensors and/or cameras 140 may send the object position to the occlusion accommodation application 120 via wired or wireless communications. The ability of the occlusion accommodation application 120 to receive three dimensional data from the one or more sensors and/or cameras 140 eliminates the current need for the user to touch the display in order for a position of the object to be estimated. As a result, the object may be positioned in midair.

The object position determined by the one or more sensors and/or cameras 140 may be based on, but is not limited to, a volumetric model or mesh, a geometric model and a skeletal model of a hand and/or item. A volumetric model may represent an object as a fine partition of space. In an embodiment, voxels may be an instance of a volumetric model and may represent the object position. A volumetric mesh may include data about the interior volume of the hand and/or item. A geometric model may represent an object as a two or three dimensional mathematical shape. A skeletal model may represent an object as a series of lines and points. For example, the lines may represent bones and the points may represent joints. In order to determine the width and depth of a hand, the average width and depth may be calculated around the bone and/or joint in the skeletal model.

The models may allow the occlusion accommodation application 120 to accurately determine the position of the object. The models are able to depict small movements of the object. For example, the models may provide a new object position 108 when a user's finger moves midair. The models provide the occlusion accommodation application 120 with real-time data about the object position 108. As a result, the occlusion accommodation application 120 can determine occlusion from an object in midair in real-time.

The occlusion accommodation application 120 may determine the object position 108 based on the received input about the actual data about a position of an object. The occlusion accommodation application 120 may determine the eye position 106 based on the input about the actual position of a user's head and/or eyes. The occlusion accommodation application 120 may determine the object position 108 and the eye position 106 relative to the display position 110. Based on the inputs, the occlusion accommodation application 120 may accurately determine the occluded area on the display.

The occlusion accommodation application 120 may output 130 the determined occluded area. The occluded area may include content from the display. Content may include but is not limited to, dialog boxes, toolbars, images, pictures, words, letters, numbers, symbols, videos, animations, media information, digital information, etc. The occlusion accommodation application 120 may output 130 the content from the occluded area to a different area of the display.

The occlusion accommodation application 120 may be stored in a memory 150. Examples of a memory may include any tangible media capable of storing electronic data, including volatile memory or non-volatile memory, removable or non-removable memory, erasable or non-erasable memory and writeable or re-writeable memory. The memory 150 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

The occlusion accommodation application 120 may be executed by a processing component 160. The processing component 160 may comprise various hardware elements, software elements, or a combination of both. Examples of hardware elements may include devices, components, analog filters, digital filters, lenses, filter lenses, mirrors, processors, processor circuits, processing units, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

The occlusion accommodation application 120 may include a sensing modality 170. Sensing modalities may include, but are not limited to gaze tracking or eye movement detection devices, cameras and any optical capture device. In an embodiment, the occlusion accommodation application 120 may be used to determine whether the sensing modality 170 is blocked from viewing a user's eyes. For example, the sensing modality may be mounted at the bottom of the display. Because of this positioning, a user's gestures may easily block the line of sight from the sensing modality to the user's eyes. Without knowledge of the occlusion, the sensing modality may continue to hunt for the user's eyes. The occlusion accommodation may determine that an object is blocking the sensing modality from viewing the user's eye and may alert the sensing modality of the occlusion through the occlusion warning component discussed in FIG. 2.

FIG. 2 illustrates an embodiment of the occlusion accommodation application 120. The occlusion accommodation application 130 may be implemented as hardware, software or some combination thereof. Determining whether the occlusion accommodation application 120 is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The occlusion accommodation application 120 may include a viewing perspective component 222 and an occluded area determination component 224. Optionally, the occlusion accommodation application 120 may include a content adjustment component 226 and an occlusion warning component 228.

The viewing perspective component 222 may determine a three dimensional viewing area based on the eye position 106 and the display position 110. Using the eye position and the display position, the viewing perspective component 222 may determine a three dimensional viewing area representing the viewing perspective of the user. The viewpoint of the user may be determined based on the eye position 106. As discussed above, the eye position 106 may be the position of the user's head determined based on locating and tracking the user's eyes. If the user's head position is provided, then the viewing perspective component 222 may determine the position of the user's eyes based on the head position. For example, the viewing perspective component 222 may use the average location of a user's eyes given the circumference of the user's head.

The eye position 108 may provide the eye position of one or both eyes. As each eye has a slightly different perspective, the viewing perspective component 222 may use either a single eye or both eyes to determine a three dimensional viewing area of the user. If both eyes are used, the viewing perspective component 222 may determine a first three dimensional viewing area for a first eye and a second three dimensional viewing area for a second eye. In an embodiment, the three dimensional viewing area may be the union of the first three dimensional viewing area and the second three dimensional viewing area. Alternatively, the three dimensional viewing area may be the intersection of the first three dimensional viewing area and the second three dimensional viewing area.

Figure 3:
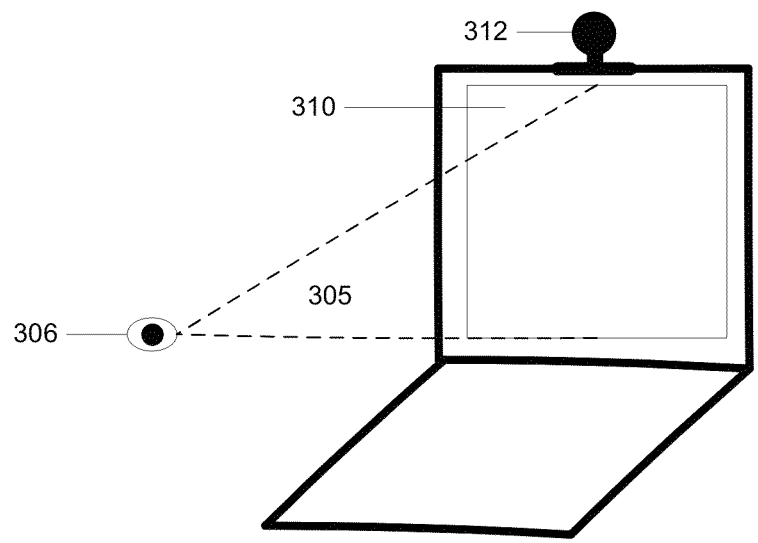
FIG. 3 illustrates an embodiment of a third system.

FIG. 3 depicts a computing system illustrating the determination of the three dimensional viewing area from the eye position. A camera and/or sensor 312 may locate the eye 306 and determine the eye position 106. Additionally, the camera and/or sensor 312 may determine the display position 110. Alternatively, the occlusion accommodation application 120 may have previously received the display position 110. The three dimensional viewing area 305 may be determined using the eye position 106 from the position of an eye 306 and the display position 110 from the position of the display 310.

Referring back to FIG. 2, the occluded area determination component 224 may determine when the object occludes an area on the display 310. Using the object position 108 determined by a camera and/or sensor 312, the occluded area determination component 224 may mathematically determine whether any area on the display is occluded. The occluded area determination component 224 may mathematically determine the extent and/or shape of the area on the display 310 that is occluded based on the object position 108. The occluded area determination component 224 may mathematically compute a set of pixels on the display that are occluded to determine the size of the area on the display that is occluded.

In an embodiment, the occluded area determination component 224 may apply a geometric perspective projection to the position of an object in order to determine when the object occludes an area on the display 310. A geometric perspective projection may be a process and/or transformation that converts coordinates from one space into another space. A geometric perspective projection may be represented as a matrix that multiplies 3D coordinates and transforms them into new projected 3D coordinates. For example, the geometric perspective projection may be applied to the object position to determine the extent and/or shape of the occlusion of the 3D object on the 2D display. Mathematically, a geometric perspective projection in 3D space is commonly represented as a 3×3 matrix (or 4×4 matrix if using homogeneous coordinates). The matrix may multiply a 3D point and convert the 3D point into another 3D point that is on the plane of the display. In other words, the geometric perspective projection flattens points onto a plane from the perspective of an origin point. For example, the geometric perspective projection flattens points onto the display from the perspective of the user's eye. The occluded area determination component 224 may apply a geometric perspective projection to the object position to determine the occluded area on the 2D display.

Figure 4:
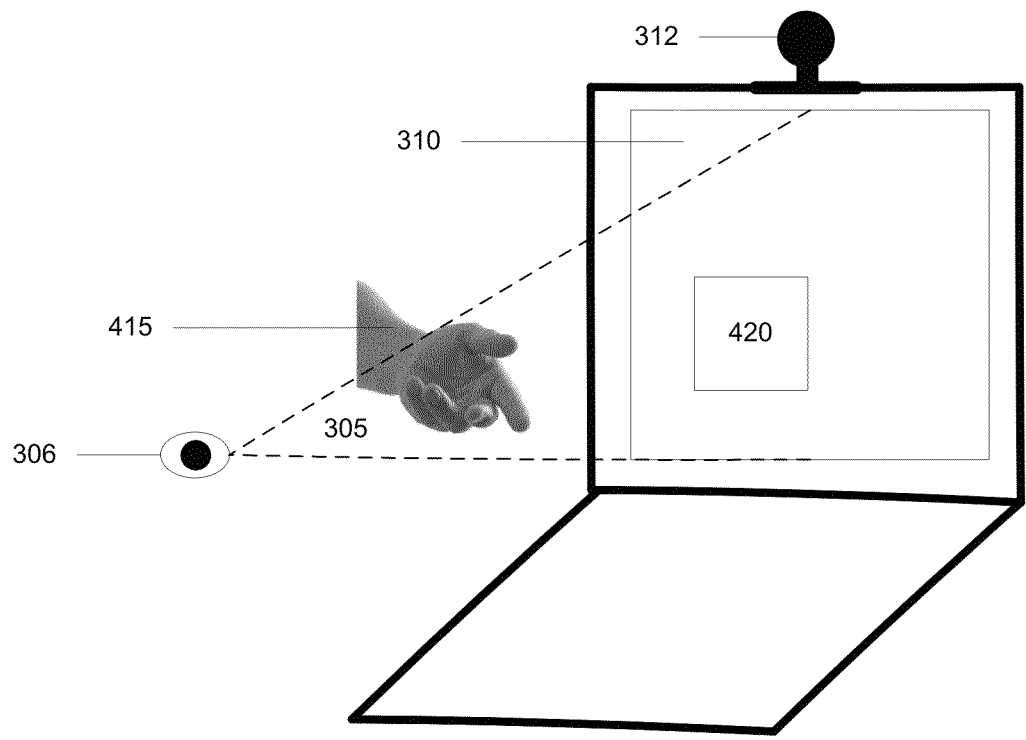
FIG. 4 illustrates an embodiment of a fourth system.

FIG. 4 depicts an occluded area on the display. An object 415 may be positioned between the user's eye 306 and the display 310. The camera and/or sensor 312 may determine the three dimensional position of the object 415. The object 415 may include the user's hand as shown in FIG. 4. In alternate embodiments, the object may include one or more of a user's anatomy (e.g., hands, fingers, digits, arms, shoulders, etc.) and/or an item held by a user (e.g., a control device) while the user is interacting with the computing device and viewing a display of the computing device.

The occluded area determination component 226 may determine an occluded area 420. The occluded area 420 may be an area on the display 310 that cannot be viewed by the user. An occluded area 420 may be determined based on the viewpoint of the user. The geometric perspective projection may be applied to the object position to determine the extent and/or shape of the occluded area 420 on the 2D display.

When the object 415 and/or the user's eye 306 change position, the occluded area 420 may change position. The change in the occluded area 420 may occur in real-time. Additionally, when there is a change in position of the user's eye or the object, the size and/or shape of the occluded area 420 may be increased or decreased depending on the object position 106. For example, a change in the object position may cause more or less of an area of the display to be occluded.

Referring back to FIG. 2, the occlusion accommodation application 120 may include a content adjustment component 226. The content adjustment component 226 may determine the content presented on the display that is located in the occluded area 420. Content may include static content and/or dynamic content. Static content may include, but is not limited to, dialog boxes, toolbars, images, pictures, words, letters, numbers, symbols, etc. Dynamic content may include, but is not limited to, videos, animations, media information, digital information, etc.

The content adjustment component 226 may move, adjust or relocate the content from the occluded area 415 to another area on the display 310. The content adjustment component 226 may display the occluded content. The occluded content may be readjusted on the display to be located above, below, to the left side or to the right side of the occluded area 415. The content adjustment component 226 may automatically move the occluded content to a new area on the display 310. The occluded content may be automatically moved in real-time to a different area of the display 310. In an embodiment, the content adjustment component 226 may determine where the user prefers to have the occluded content moved on the display. The content adjustment component 226 may move the content to the preferred position. In an alternative embodiment, the occluded content may be moved to an area on the display based on the other content on the display. For example, if the display has an area with little or no content, the occluded content may be moved to that area of the display.

Figure 5:
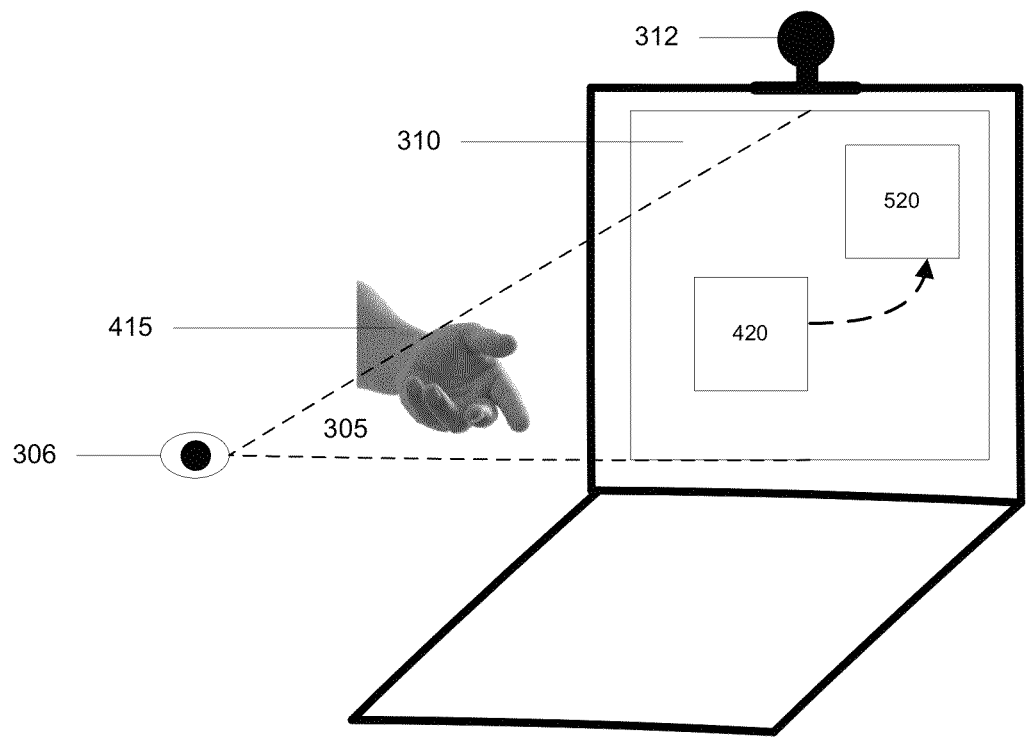
FIG. 5 illustrates an embodiment of a fifth system.

FIG. 5 depicts presenting the occluded content on a different area of the display. The content from the occluded area 420 may be moved to a different area on the display 310. The content may be displayed in an area visible to the user's eye 306 based on the eye position 106 and the display position 110. As shown in FIG. 5, the content from the occluded area 420 may be presented in a different area on the display 310. Presenting, in real-time, the occluded content 520 in a different area on the display 310 ensures that the user does not miss of the occluded content.

Referring back to FIG. 2, the occlusion accommodation application 120 may optionally include an occlusion warning component 228. In addition to tracking an object and determining an occluded area on the display, the viewing perspective component 222 and the occluded area determination component 224 may assist the system 100 with sensing modalities.

Sensing modalities may include, but are not limited to, cameras, sensors, gaze tracking or eye movement detection devices or other capture devices. The sensing modality is often mounted at the bottom of the display. Because of this positioning, a user's gestures may easily block the line of sight from the sensing modality to the user's eyes. Without knowledge of the occlusion, the sensing modality may continue to hunt for the user's eyes.

Figure 6:
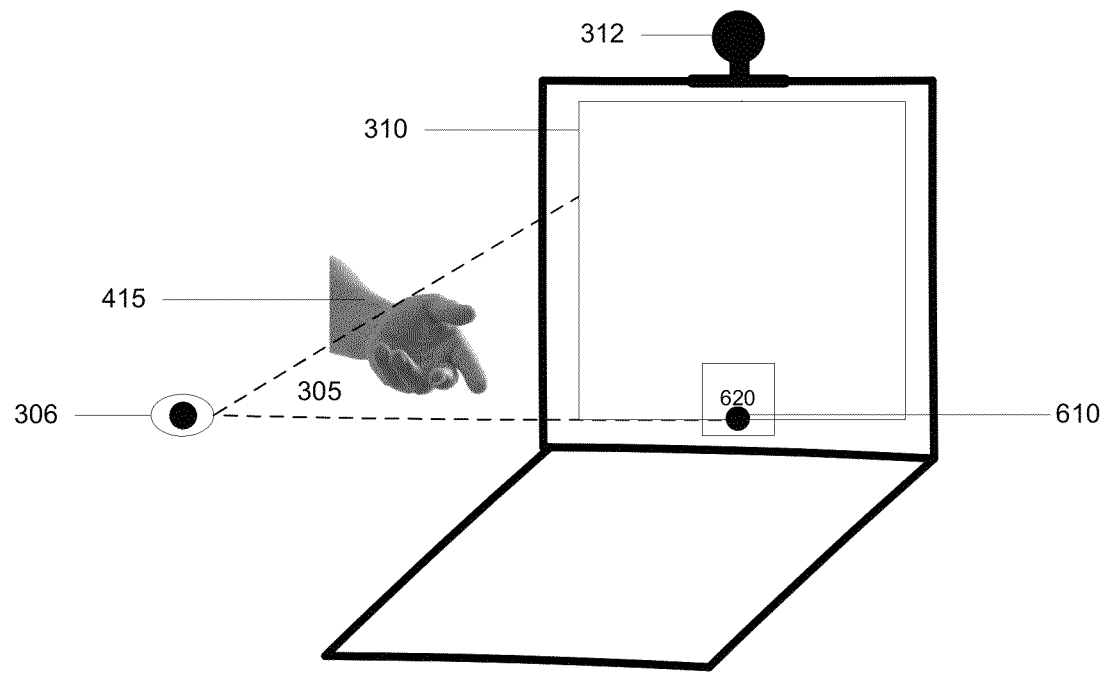
FIG. 6 illustrates an embodiment of a sixth system.

FIG. 6 depicts a sensing modality. The viewing perspective component 222 may receive a position of the sensing modality. For example, the viewing perspective component 222 may have previously determined an eye position 106 from a position of a first camera. The viewing perspective component 222 may determine a position of a second camera. The second camera may act as a sensing modality 610. The sensing modality 610 may be positioned on or adjacent to the display 310. A sensing modality position may include a three dimensional position of the sensing modality 610. In an embodiment, information included in the display position 110 may include the position of the sensing modality 610 along with the position of the display 310. Alternatively, the sensing modality position may be information received directly from the sensing modality.

The occluded area determination component 224 may determine whether the sensing modality 310 is blocked, instead of or in addition to, determining the size of the occluded area on the display 310 is blocked. The occlusion warning component 228 may determine a position of a sensing modality and may determine whether the sensing modality is occluded from tracking the eye position as a result of the object position. The occluded area determination component 224 may apply a geometric perspective projection to the position of the object 415 to determine whether the sensing modality 610 is blocked. For example, the sensing modality 610 may be a gaze tracking device arranged to track a user's eye 306. The user may be gesturing in order to communicate with the computing system 100. The user's gesturing may include an object 415, such as, but not limited to, hands of the user, an item, or an item held by the user, which occludes the gaze tracking device 610. When an occluded area 620 includes the gaze tracking device 610, the occluded area determination component 224 may communicate with the occlusion warning component 228.

The occlusion warning component 228 may send a warning message to the sensing modality 610 that an object 415 is occluding the sensing modality 610 from tracking the eye 306. The occlusion warning component 228 may inform the sensing modality that the user's eye 306 is temporarily unavailable based on the position of the object 415. Informing the sensing modality 610 of the unavailability may prevent the sensing modality 610 from entering an error state based on the sensing modality's 610 inability to track the user's eye 306. Instead of entering an error state, the sensing modality 610 may continue to wait unit the eye 306 can once again be tracked. In an embodiment, the occlusion warning component 228 may give feedback to the user and may instruct the user to move so that the sensing modality 610 can view the user's eye. In an alternate embodiment, the occlusion warning component 228 may cause an application running on the computing device to pause or decrease the running speed of the application in order for the user to remove the occluding object so that the user doesn't lose or end the application due to lost tracking. For example, the user may be playing a video game and the occlusion warning component 228 may cause the video game to pause in order for the user to remove the occluding object so that the user doesn't lose the game.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7 illustrates a logic flow of determining occlusion. The occlusion accommodation application in the computing system may accommodate content occluded from an area on a display. The logic flow 700 may determine, relative to a position of a display, an eye position of a user and an object position of an object at block 705.

A position of the display 310 may be received by the occlusion accommodation application 120 in the system 100. The display 310 may be in a computing device. The display 310 may present visual content. The display 310 may include, but is not limited to, a plasma, a liquid crystal display (LCD), a cathode ray tube (CRT), a light emitting diode (LEDs), an organic light emitting diode (OLED) display and/or a red/green/blue (RGB) display, among others. The display position 110 may include a three dimensional position. The display position 110 may include the size and orientation of the display 310.

A position of a user's eyes 306 may be received by the occlusion accommodation application 120 in the system 100. A user may be interacting with a computing device using a gesture interface system. While simultaneously gesturing with the user's hands or an item held by the user, the user may be viewing the display 310.

A position of the object 415 may be received by the occlusion accommodation application 120 in the system 100. The object may be positioned between the display and the eye of the user. The object 415 may include hands of the user, an item, or an item held by the user occluding the view of the user. The object position may be in midair. For example, the object position 108 may include a pose of the user's hand waving. In an embodiment, the object position 108 may include three dimensional information, such as, a volumetric model or geometric model of the user's hand. In an alternative embodiment, the object position 108 may include a skeletal model of a hand. The computing system 100 may create a three dimensional object position 108 based on the skeletal hand information received. For example, if the skeletal model discloses the position of a user's knuckles, a three dimensional object position 108 may be determined based on an average size finger width at the knuckle. Although the width of the finger may be approximated, the positioning of the finger is based on the skeletal model which provides actual data for the position of the bones and joints. As such, the skeletal model may provide real-time information about any movement of the object 415 which could affect the size, shape and positioning of the occluded area.

The logic flow 700 may identify an occluded area on the display based on the object position, the display position and the eye position at block 710. Using the object position 108, the occlusion accommodation application 120 may algorithmically determine the size of the area on the display 310 that is occluded based on the object position 108. The occlusion accommodation application 120 may use mathematics to determine the bounds the occluded area on the display from the user's perspective. The occlusion accommodation application 120 may apply a geometric perspective projection, based on the eye position and the display position, to the object position in order to determine an occluded area.

The logic flow 700 may present content from the occluded area on the display in a different area on the display at block 715. The content from the occluded area 420 may be moved, adjusted or relocated to another area on the display 310. The content from the occluded area 420 may be readjusted on the display to be located above, below, to the left side or to the right side of the occluded area 415. The content from the occluded area 420 may be automatically moved in real-time to a different area of the display 310. The content from the occluded area 420 may be moved to an area on the display 310 based on the other content on the display 310. For example, if the display has an area with little or no content, the content from the occluded area 420 may be moved to that area of the display.

Figure 8:
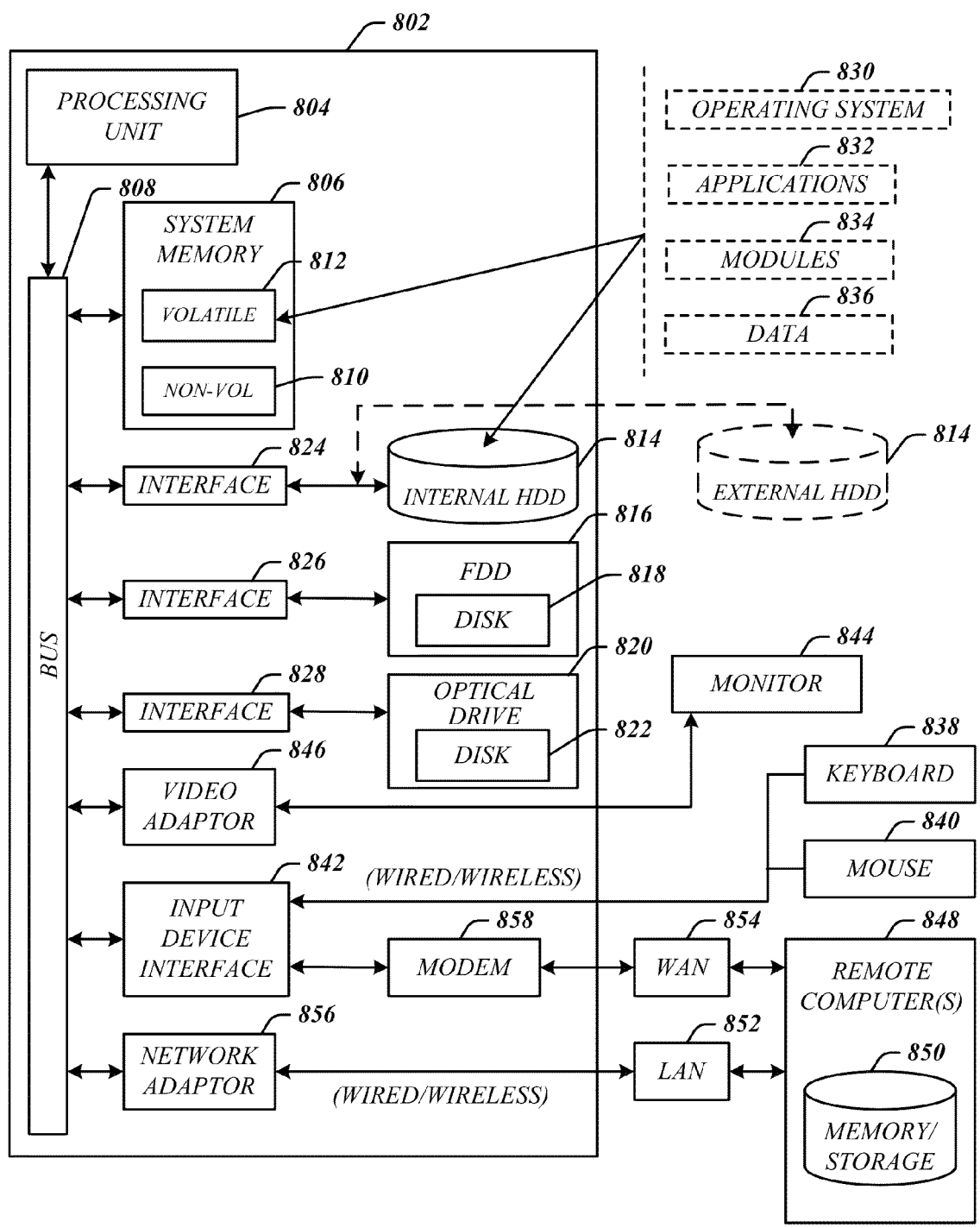
FIG. 8 illustrates an embodiment of a computing architecture.

FIG. 8 illustrates an embodiment of an exemplary computing architecture 800 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 800 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 800 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors. Dual microprocessors and other multi-processor architectures may also be employed as the processing unit 804. The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures.

The computing architecture 800 may comprise or implement various articles of manufacture. An article of manufacture may comprise a computer-readable storage medium to store logic. Embodiments may also be at least partly implemented as instructions contained in or on a non-transitory computer-readable storage medium, which may be read and executed by one or more processors to enable performance of the operations described herein. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836.

The one or more application programs 832, other program modules 834, and program data 836 can include, for example, a viewing perspective component 222, an occluded area determination component 224, a content adjustment component 226 and an occlusion warning component 228.

A user can enter commands and information into the computer 802 through one or more wire/wireless input devices, for example, a keyboard 838 and a pointing device, such as a mouse 840. Other input devices may include a microphone, an infra-red (IR) remote control, a joystick, a game pad, a stylus pen, touch screen, or the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The computer 802 is operable to communicate with wire and wireless devices using any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The computer 802 is operable to communicate with wire and wireless devices using various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media may include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

Figure 9:
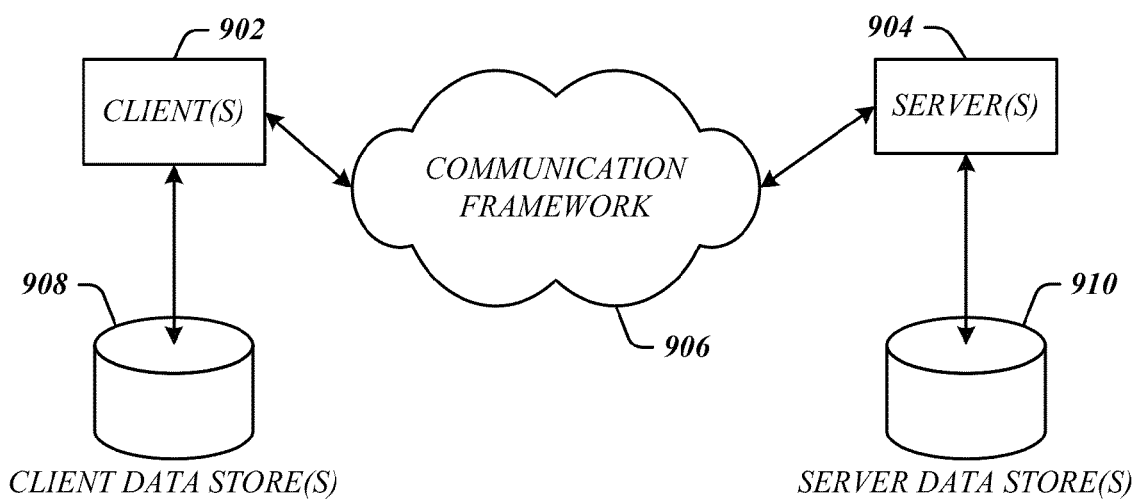
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, and so forth. The embodiments, however, are not limited to implementation by the communications architecture 900.

As shown in FIG. 9, the communications architecture 900 comprises includes one or more clients 902 and servers 904. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

In an embodiment, an apparatus may include a processor circuit and an occlusion accommodation application operative on the processor circuit to determine an occluded area on a display. The occlusion accommodation application may include a viewing perspective component operative to determine an eye position of at least one eye of a user and a display position of the display. The occlusion accommodation application may include an occluded area determination component operative to determine the occluded area based on an object position of an object positioned between the display and the at least one eye of the user, the display position and the eye position. The object may include one or more hands of the user, an item, or an item held by the user. The occlusion accommodation application may include an occlusion warning component operative to determine a sensing modality position of a sensing modality and determine whether the sensing modality is occluded from tracking the eye position as a result of the object position. The occlusion accommodation application may include a content adjustment component operative to determine content presented on the display that is located in the determined occluded area and present the occluded content in a different area on the display. The viewing perspective component may determine the object position of the object based on a geometric model, a volumetric model or a skeletal model. The occluded area determination component operative to apply a geometric perspective projection to the object position based on the eye position and the display position. The viewing perspective projection component may determine an object position when the object is arranged in midair proximate to the computing device. The occluded area determination component may mathematically determine one or more bounds of the occluded area. The display comprises a digital display operatively coupled to the processor circuit. The apparatus may include one or more cameras operatively coupled to the processor circuit, the camera system comprising one or more of a depth camera, a stereo camera, an infrared camera and a Red-Green-Blue camera. The apparatus may include one or more sensors or cameras to determine the object position of an object.

In another embodiment, at least one machine readable medium comprising a plurality of instructions that in response to being executed on a computing device may cause the computing device to determine a display position of a display of a computing device, an eye position of an eye of a user and an object position of an object positioned between the display and the eye of the user and identify, in real-time, an occluded area based on the display position, object position and the eye position. The plurality of instructions that in response to being executed on a computing device may cause the computing device to apply a geometric perspective projection to the object position based on the eye position and the display position. The plurality of instructions that in response to being executed on a computing device may cause the computing device to present content from the occluded area on the display in a different area on the display. The plurality of instructions that in response to being executed on a computing device may cause the computing device to receive the object position based on one or more of a geometric model, a volumetric model or a skeletal model. The plurality of instructions that in response to being executed on a computing device may cause the computing device to determine an object position of an object arranged in midair proximate to the computing device. The plurality of instructions that in response to being executed on a computing device may cause the computing device to determine an object position of an object, wherein the object position comprises three dimensional data about a position of the object relative to the computing device. The plurality of instructions that in response to being executed on a computing device may cause the computing device to determine content of the occluded area.

In some embodiments, a system may include a processor circuit, a digital display operatively coupled to the processor circuit and an occlusion accommodation application operative on the processor circuit to determine an occluded area on a display. The occlusion accommodation application may include a viewing perspective component to determine an eye position of at least one eye of a user and the display position of a display and an occluded area determination component to determine, in real-time, an occluded area of the display based on the eye position, display position and an object position of an object positioned between the display and the at least one eye of the user. The occlusion accommodation application may include a content adjustment component to determine occluded content based on the determined occluded area of the display; and present the occluded content in a different area on the display. The occluded area determination component may mathematically determine one or more bounds of the occluded area. The occluded area determination component may apply a geometric perspective projection to the object position.

In an embodiment, a computer-implemented method may include determining an eye position of a user and an object position of an object positioned between the display and the at least one eye of the user, identifying an occluded area on the display based on the eye position, the display position and the object position of an object positioned midair between the display and the at least one eye of the user; and presenting content from the occluded area on the display in a different area on the display. The computer-implemented method may determine one or more of the shape and extent of the occluded area. The computer-implemented method may include determining the eye position, the display position and the object position in real-time. The object position may include three dimensional data about a position of the object relative to the computing device. The object may include one or more hands of the user, an item, or an item held by a hand of the user. The computer-implemented method may include determining the object position based on one or more of a geometric model, a volumetric model, or a skeletal model. The computer-implemented method may include determining the eye position based on one or more of a camera or a sensor coupled to the computing device. The computer-implemented method applying a geometric perspective projection to the object position.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a processor circuit; and
an occlusion accommodation application operative on the processor circuit to determine an occluded area on a display, the occlusion accommodation application comprising:
a viewing perspective component operative to determine an eye position of at least one eye of a user, a display position of the display, and an object position of an object positioned in an area physically away from the display and between the display and the at least one eye of the user, the object not touching the at least one eye of the user;
an occlusion warning component operative to determine a sensing modality position of a sensing modality, determine whether the sensing modality is occluded from tracking the eye position of the at least one eye of the user as a result of the object position and send a warning to the sensing modality if the sensing modality is occluded;
an occluded area determination component operative to determine the occluded area based on the object position, the display position and the eye position; and
a content adjustment component operative to determine content presented on the display that is located in the determined occluded area and present the occluded content in a different area on the display.

2. The apparatus of claim 1, the object comprises one or more hands of the user, an item, or an item held by the user.

3. The apparatus of claim 1, the sensing modality comprising a gaze tracking detection device, an eye movement detection device or a camera.

4. The apparatus of claim 1, the viewing perspective component operative to determine the object position of the object based on a geometric model, a volumetric model or a skeletal model.

5. The apparatus of claim 1, the occluded area determination component operative to apply a geometric perspective projection to the object position based on the eye position and the display position.

6. The apparatus of claim 1, the occluded area determination component operative to mathematically determine one or more bounds of the occluded area.

7. The apparatus of claim 1, comprising the display, the display comprises a digital display operatively coupled to the processor circuit.

8. The apparatus of claim 1, comprising one or more cameras operatively coupled to the processor circuit, the one or more cameras comprising one or more of a depth camera, a stereo camera, an infrared camera and a Red-Green-Blue camera.

9. The apparatus of claim 1, comprising one or more sensors or cameras to determine the object position of an object.

10. At least one non-transitory machine readable medium comprising a plurality of instructions that in response to being executed on a computing device cause the computing device to:
determine a display position of a display of a computing device, an eye position of an eye of a user and an object position of an object positioned in an area physically away from the display and between the display and the eye of the user, the object not touching the at least one eye of the user;
determine a sensing modality position of a sensing modality, determine whether the sensing modality is occluded from tracking the eye position of the at least one eye of the user as a result of the object position and send a warning to the sensing modality if the sensing modality is occluded;
identify, in real-time, an occluded area based on the display position, object position and the eye position; and
cause the computing device to present content from the occluded area on the display in a different area on the display.

11. The least one non-transitory machine readable medium of claim 10, comprising a plurality of instructions that in response to being executed on a computing device cause the computing device to apply a geometric perspective projection to the object position based on the eye position and the display position.

12. The least one non-transitory machine readable medium of claim 10, comprising a plurality of instructions that in response to being executed on a computing device cause the computing device to receive the object position based on one or more of a geometric model, a volumetric model or a skeletal model.

13. The least one non-transitory machine readable medium of claim 10, comprising a plurality of instructions that in response to being executed on a computing device cause the computing device to determine an object position of an object, wherein the object position comprises three dimensional data about a position of the object relative to the display.

14. The least one non-transitory machine readable medium of claim 10, comprising a plurality of instructions that in response to being executed on a computing device cause the computing device to determine content of the occluded area.

15. The least one non-transitory machine readable medium of claim 10, the sensing modality comprising a gaze tracking detection device, an eye movement detection device or a camera.

16. A system, comprising:
a processor circuit;
a display operatively coupled to the processor circuit; and
an occlusion accommodation application operative on the processor circuit to determine an occluded area on the display, the occlusion accommodation application comprising:
a viewing perspective component to determine an eye position of at least one eye of a user, a display position of the display, and an object position of an object positioned in an area physically away from the display and between the display and the at least one eye of the user, the object not touching the at least one eye of the user;
an occlusion warning component operative to determine a sensing modality position of a sensing modality, determine whether the sensing modality is occluded from tracking the eye position of the at least one eye of the user as a result of the object position and send a warning to the sensing modality if the sensing modality is occluded;
an occluded area determination component to determine, in real-time, an occluded area of the display based on the eye position, the display position and the object position of the object positioned between the display and the at least one eye of the user; and
a content adjustment component to determine occluded content based on the determined occluded area on the display and present the occluded content in a different area on the display.

17. The system of claim 16, the occluded area determination component to mathematically determine one or more bounds of the occluded area.

18. The system of claim 16, the occluded area determination component to apply a geometric perspective projection to the object position.

19. The system of claim 16, the sensing modality comprising a gaze tracking detection device, an eye movement detection device or a camera.

20. A computer-implemented method comprising:
determining an eye position of a user and an object position of an object positioned in an area physically away from the display and between a display and at least one eye of the user, the object not touching the at least one eye of the user;
determining a sensing modality position of a sensing modality, determine whether the sensing modality is occluded from tracking the eye position of the at least one eye of the user as a result of the object position and send a warning to the sensing modality if the sensing modality is occluded;
identifying an occluded area on the display based on the eye position, a display position of the display and the object positioned in an area physically away from the display and between the display and at least one eye of the user; and
presenting content from the occluded area on the display in a different area on the display.

21. The computer-implemented method of claim 20, determining one or more of a shape and extent of the occluded area.

22. The computer-implemented method of claim 20, comprising:
determining the eye position, the display position and the object position in real-time.

23. The computer-implemented method of claim 20, the object position comprises three dimensional data about a position of the object relative to the display.

24. The computer-implemented method of claim 20, the object comprises one or more hands of the user, an item, or an item held by the user.

25. The computer-implemented method of claim 20, comprising:
determining the object position based on one or more of a geometric model, a volumetric model, or a skeletal model.

26. The computer-implemented method of claim 20, the sensing modality comprising a gaze tracking detection device, an eye movement detection device or a camera.

27. The computer-implemented method of claim 20, comprising:
applying a geometric perspective projection to the object position.

* * * * *